United States Patent [19]

Hay

[11] Patent Number: 5,013,571
[45] Date of Patent: May 7, 1991

[54] METHODS FOR MAKING TETRAHYDROISOALPHA AND HEXAHYDROISOALPHA ACIDS

[75] Inventor: Bruce A. Hay, Groton, Conn.
[73] Assignee: Pfizer Inc., New York, N.Y.
[21] Appl. No.: 473,268
[22] Filed: Jan. 31, 1990
[51] Int. Cl.$^5$ .................................................. C12C 3/00
[52] U.S. Cl. .................................... 426/600; 426/422; 568/377
[58] Field of Search .................. 568/377; 426/600, 422

[56] References Cited

U.S. PATENT DOCUMENTS

| | | | |
|---|---|---|---|
| 4,002,683 | 1/1977 | Todd, Jr. | 426/600 |
| 4,590,296 | 5/1986 | Cowles | 568/377 |
| 4,644,084 | 2/1987 | Cowles | 426/600 |

OTHER PUBLICATIONS

Verzele et al., "Sur La Transformation De L'Humulone", Cong. Internat. Indust. Ferm., pp. 297-301 (1947).
Carson, J. F., "The Alkaline Isomerization of Humulone", Isohop Hydrogenation In Exptl., 74: 4615-4620 (1952).
Byrne et al., "Reduction Products from cis-and trans-Isocohumulone", J. Chem. Soc. (C), pp. 2810-2813 (1971).
Brown et al., "Chemistry of Hop Constituents, Part XIII", The Hydrogenation of IsoHumulone, pp. 545-551, (1959).
Verzele et al., "On the Hydrogenation of Humulone, Part I", Bull. Soc. Chim. Belg. 68: 315-324, 6 fig., (1959).
Anteunis et al., "On the Hydrogenation of Humulone, Part II", Bull. Soc. Chim. Belg., 68: 476-583, 1 fig. (1959).
DeKeukeleire et al., "The Structure of the Absolute Configuration of (-)Humulone", Tetrahedron, 26: 385-393 (1970).
Verzele, M., "The Chemistry of Hops", Brewing Science, vol. 1, Chapter 4, pp. 279-323 (1979).
DeKeukeleire et al., "Regiospecific Singlet Oxygen Oxidation of (-)R-Tetrahydrohumulone and Hexahydrocolupulone", Bull. Soc. Chim. Belg. 85, No. 5: 293-304, (1976).
Meheus et al., "Humulinone", Bull. Soc. Chim. Belg. 73: 268-273, 3 fig. (1964).

Primary Examiner—Carolyn Paden
Attorney, Agent, or Firm—Peter C. Richardson; J. Trevor Lumb; A. Dean Olson

[57] ABSTRACT

A method of converting alpha acids to hop flavors by exposing the alpha acids to an environment capable of substantially simultaneously isomerizing and reducing the alpha acids to form either THIAA or HHIAA. Another aspect of this invention is directed to a method of reducing hop flavors by exposing an isoalpha acid, a dihydroisoalpha acid or a mixture thereof to conditions suitable to reduce said acids to produce THIAA, HHIAA or a mixture thereof at a pH of about 5 to about 12 in a reaction inert, protic solvent. Yet another aspect of this invention is directed to a method of reducing hop flavors comprising exposing an isoalpha acid, a dihydroisoalpha acid or a mixture thereof to conditions suitable to reduce said acids to produce THIAA, HHIAA or a mixture thereof in a reaction inert, aprotic solvent.

33 Claims, No Drawings

METHODS FOR MAKING TETRAHYDROISOALPHA AND HEXAHYDROISOALPHA ACIDS

CROSS-REFERENCE TO RELATED APPLICATION

Attention is directed to commonly assigned, copending application, U.S. application Ser. No. 473,089 filed Jan. 31, 1990, entitled "Steam Stripping of Odor Forming Impurities From Hop Flavors" which discloses purification of hop flavors, the disclosure of which is incorporated by reference.

TECHNICAL FIELD

The field of art to which this invention relates is the production of beer bittering agents from hops and, more particularly, the production of tetrahydroisoalpha and hexahydroisoalpha acids.

BACKGROUND ART

Hops have been used for centuries for the purpose of contributing a clean bitter taste to beer. Analysis of hop constituents has demonstrated that the most important bittering compounds derived naturally from hops are a group of isomers and analogous compounds generally known as alpha acids (humulones) and their derivatives isoalpha acids (isohumulones). Other derivatives [e.g., dihydroisoalpha acids, tetrahydroisoalpha acids (THIAA, tetrahydroisohumulones) and hexahydroisoalpha acids (HHIAA, hexahydroisohumulones)] are produced commercially.

In a conventional brewing process, hop cones are boiled with sweet wort in a copper kettle for about one to two hours, and then the wort is filtered and allowed to cool. Isoalpha acids are produced by isomerization of alpha acids during boiling of the wort. However, the isomerization yield in the boiling process is low and thus commercial processes have been utilized to extract the active compounds (alpha acids and beta acids) from the hops and convert them to the desired hop flavors (e.g., isoalpha acids, tetrahydroisoalpha acids) at relatively high yields. The commercially produced hop flavors may then be added post-fermentation so that they are not adversely affected during the wort boil.

In one commercial process, alpha acids are isomerized and reduced to dihydroisoalpha acids under basic conditions with a reducing agent such as sodium borohydride at elevated temperatures. In another commercial process, alpha acids are isomerized into isoalpha acids under basic conditions at elevated temperatures. Tetrahydroisoalpha acids are produced commercially by a multi-step route from beta acids, and hexahydroisoalpha acids are produced commercially by a reduction of tetrahydroisoalpha acids.

In addition, the literature teaches the hydrogenation of normal homolog isoalpha acids at a pH of about 3 resulting in low yields of tetrahydroisoalpha acid (P. M. Brown, G. A. Howard and A. B. Tatchell, *J. Chem. Soc.* 545 (1959)). That reference also teaches the hydrogenation with platinum oxide of normal homolog isoalpha acids at a pH of about 10 to give a low yield of isoalpha acids with only one double bond hydrogenated. The reference also teaches the hydrogenation of normal homolog isoalpha acids at a pH of about 3 to yield a deoxygenated THIAA. Another reference teaches the reduction of THIAA to deoxygenated products by hydrogenation with palladium on carbon in methanol at a pH of about 3 (E. Byrne and S. J. Shaw, *J. Chem. Soc.* (C), 2810 (1971)).

Although there are a variety of methods known to transform alpha acids to the desired hop flavor, there is a continuing search in this field of art for processes that are simple, inexpensive, and high yielding.

SUMMARY OF THE INVENTION

This invention is directed to a method of converting alpha acids to hop flavors by exposing the alpha acids to an environment capable of substantially simultaneously isomerizing and reducing the alpha acids to form either THIAA or HHIAA.

Another aspect of this invention is directed to a method of reducing hop flavors by exposing an isoalpha acid, a dihydroisoalpha acid, or a mixture thereof to conditions suitable to reduce said acids to produce THIAA, HHIAA, or a mixture thereof at a pH of about 5 to about 12 in a reaction inert, protic solvent.

Yet another aspect of this invention is directed to a method of reducing hop flavors comprising exposing an isoalpha acid, a dihydroisoalpha acid, or a mixture thereof to conditions suitable to reduce said acids to produce THIAA, HHIAA, or a mixture thereof in a reaction inert, aprotic solvent.

Other features and advantages will be apparent from the specification and claims.

DETAILED DESCRIPTION OF THE INVENTION

This process is applicable to alpha acids having the formula:

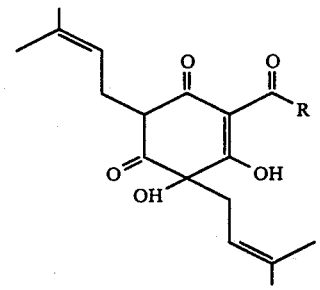

In commercial processes, the alpha acids are derived from hops where they exist as different homologs, stereoisomers, optical isomers, and combinations thereof. Typically, the primary homologs are those in which R is isopropyl, isobutyl and sec-butyl. The alpha acids can be isolated from hops by a process in which the organic components of the crushed hop cones are extracted by liquid $CO_2$. The beta acids are then separated from the alpha acids using an aqueous extraction at a pH of about 8 to about 8.3. In addition, the synthetic production of alpha acids has been described, albeit at low yields, by for example, E. Collins, G. D. John, P. V. R. Shannon, *J. Chem. Soc. Perkin I*, 96 (1975).

The processes of this invention are used to produce reduced isoalpha acids, preferably tetrahydroisoalpha acids (THIAA) and hexahydroisoalpha acids (HHIAA) having the formula:

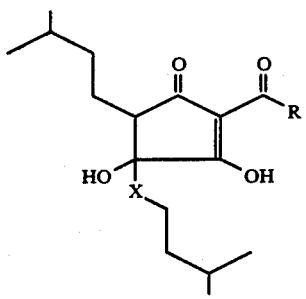

where X is C=O (THIAA) or CHOH (HHIAA) and R is isopropyl, isobutyl, and sec-butyl.

As these compounds are produced from the above described alpha acids (which when extracted from hops exist as homologs, stereoisomers, optical isomers and combinations thereof), THIAA and HHIAA as produced by the processes of this invention generally exist as the corresponding homologs, stereoisomers, and optical isomers and combinations thereof of the above described alpha acids.

The principal process of this invention comprises the substantially simultaneous isomerization and reduction of alpha acids to THIAA and/or HHIAA. When it is desired to convert alpha acids into THIAA, the process involves using a reducing medium comprising hydrogen gas, preferably in the presence of a noble metal catalyst. When it is desired to convert alpha acids into HHIAA, the process involves using a reducing medium comprising hydrogen gas (preferably in the presence of a noble metal catalyst) and a hydride reducing agent. By substantially simultaneous is meant that the isomerization and reduction occur in the same reaction medium. However, it is believed that isomerization precedes reduction within the reaction medium.

Preferably, the process comprises adjusting, if necessary, the pH of a solution of the alpha acid to the desired range, and, if necessary, adding buffering, chelating, and reducing agents (described below) as desired and exposing the alpha acid to hydrogen at elevated temperatures and pressures, typically in the presence of a hydrogenation catalyst. The product can then be isolated by acid precipitation and purified by, for example, steam stripping as detailed in the Examples and as described in commonly assigned copending application "Steam Stripping of Odor Forming Impurities From Hop Flavors".

Any source of hydrogen gas may be used in the hydrogenation of this invention. However, the reactions may be performed under a mixture of hydrogen with a safe and reaction inert gas such as nitrogen.

Preferably, the process uses a hydrogenation catalyst, such as a noble metal, which increases the speed of the reaction. It is especially preferred that palladium is utilized as it has been found to provide high yields, good purity and short reaction times in contrast to other hydrogenation catalysts. Typically, the catalyst is disposed on a finely divided support material. Preferable support materials include finely divided carbon, barium carbonate, barium sulfate, calcium carbonate and alumina. Suitable carbon supported palladium catalysts are well known in the art.

The pH of the alpha acid solution should be such that the simultaneous isomerization and reduction yields the desired end product. Preferably the pH is such that the alpha acid is soluble in the solvent system, as described below. Depending on the form of the alpha acid (oil, salt, etc.), the pH may require adjustment. This is accomplished by conventional methods, such as addition of a suitable base (e.g., KOH). It is especially preferred that the pH is about 8 to about 12, as below about pH 8 the isomerization is not efficient, while above about pH 12 side chain cleavage can occur. A pH of about 10 to about 11 has been found to give the best results.

A buffer may be advantageously utilized in quantities sufficient to aid in maintaining the desired pH (as described above). Typically, a base buffering agent such as potassium or sodium carbonate may be utilized.

In addition, it is preferred that an alkaline earth metal salt is added that facilitates the reaction. Exemplary alkaline earth metal salts include magnesium chloride and calcium chloride, of which magnesium chloride has been found particularly effective. Preferably, an amount of alkaline earth metal salt effective to achieve the desired isomerization is used. However, preferably, an amount of alkaline earth metal salt (e.g., magnesium chloride) is used that does not adversely affect the hop oil solubility since magnesium, for example, can be retained in the hydroisoalpha acids. The amount added is typically about 1% to about 5% relative to alpha acids.

For the production of hop oils such as HHIAA it is preferred to add a reducing agent to this simultaneous isomerization and reduction scheme to simultaneously reduce the nonconjugated side chain carbonyl group to an alcohol group (in contrast to THIAA). It is especially preferred that a reducing agent such as sodium borohydride or potassium borohydride is used because of its reactivity and specificity. Sodium borohydride is particularly useful because of its commercial availability as an aqueous solution stabilized with sodium hydroxide. Typically, an amount of reducing agent effective to achieve the desired product is used. Preferably, about two hydride equivalents to about three hydride equivalents of a reducing agent such as sodium borohydride are used. A hydride equivalent is defined as the number of hydrogen atoms available for substrate reduction, for example sodium borohydride has four hydride equivalents.

Typically, the combined isomerization and reduction is performed at a pressure of about atmospheric to about 100 psig and higher (eg., 2000 psig). Generally, a higher pressure increases the rate of reaction. Preferably, the reaction is performed at a pressure of about 40 psig to about 60 psig because of typical equipment constraints. Any temperature can be used in which the alpha acid is in solution (e.g., those described below); however, preferably, the temperature is about 50° C. to about 200° C. because below about 50° C. the alpha acid may come out of solution and above about 200° C. the reactants may be degraded. Generally, the reaction time varies with the pressure, temperature, reactant concentration, catalyst amount, etc.; however, for typical conditions of 50 psig, 100° 20% by weight alpha acids, and 2% by weight catalyst, reaction times of about 4 hours to about 6 hours are normal.

Any solvent system that results in the desired end products may be used; however, typically, a system sufficiently protic to achieve the desired pH is used as this facilitates the isomerization. Preferably, protic solvents are used. Exemplary protic solvent systems include water, aqueous alcohols, alcohols, and acetic acid. Preferably the solvent system is reaction inert. As used here and elsewhere herein, the expression "reaction inert solvent" refers to a solvent which does not interact with starting material, reagents, intermediates or desired product in a manner which adversely affects the yield of the desired product.

In addition, nonprotic solvents can be used in combination with protic solvents. These include chlorinated solvents such as methylene chloride, dichloroethylene, or trichloroethylene and hydrocarbon solvents such as hexane. Typically the reaction is performed at about 5% to about 30% concentration of alpha acids to facilitate productivity and dissolution. Preferably, the reaction is run at about 20% to about 30% alpha acid concentration as this increases the productivity.

The above process provides high yields (e.g., 90% and above) of THIAA depending on a variety of factors including temperature, time, catalyst loading, etc. Yields of HHIAA are typically lower.

EXAMPLE 1

A 100 gram of aqueous alpha acid solution at pH 8 containing 14.4% alpha acids by HPLC analysis was acidified to a pH below 2 with 50% sulfuric acid. The oil was separated, 75 milliliters of water was added, and 20% aqueous potassium hydroxide solution was slowly added under nitrogen with stirring and gentle heating to adjust the pH to 10.5. Care was taken to insure that the pH did not go above 10.5. After all of the material had dissolved and the pH stabilized, 1 gram of potassium carbonate and 1 gram of magnesium chloride hexahydrate were added. After stirring, the pH was readjusted to 10.5 with 20% aqueous potassium hydroxide solution, 2 grams of 10% palladium on carbon was added, and the mixture was hydrogenated on a Parr shaker at 50 psig and 100° C. for 6 hours. The reaction mixture was cooled, 100 milliliters of ethanol was added, and the catalyst was removed by filtration. The ethanol was removed by rotary evaporation, and the solution was acidified to a pH below 2 with 50% sulfuric acid. The oil was separated, 100 milliliters of water was added, the mixture was shaken, and the oil was separated to yield 19.8 grams of material. This material was assayed at 65% THIAA by HPLC for an 89% yield from alpha acids. The material was then steam stripped according to the following procedure.

A 10 gram sample of THIAA oil with a noticeable ethyl ester odor was added to 50 grams of water. The mixture was heated to 100° C. under a nitrogen atmosphere with stirring, and the pH was slowly brought to 10.5 with 20% by weight aqueous potassium hydroxide solution. After all of the oil was in solution and the pH had stabilized, the heat was increased to reflux conditions and water was distilled from the mixture. Alternatively, in the above synthesis of THIAA, after removal of ethanol by rotary evaporation, the heat was increased to reflux conditions and steam distillation began at that point. Fresh water was added through an addition funnel to keep the volume of the solution constant as the distillation proceeded. Once the temperature of the distillate reached 100° C. a further 50 grams of water was distilled off. The mixture was then cooled, and acidified to a pH below 2 with 50% sulfuric acid. The oil was separated, 50 milliliters of water was added to the oil, the mixture was shaken, and the oil separated once again. The product was 10 grams of THIAA oil with no noticeable ethyl ester type odors.

EXAMPLE 2

A 100 gram sample of aqueous alpha acid solution at pH 8 containing 14.4% alpha acids by HPLC analysis was acidified to a pH below 2 with 50% sulfuric acid. The oil was separated, 75 milliliters of water was added, and 20% aqueous potassium hydroxide solution was slowly added under nitrogen with stirring and gentle heating to adjust the pH to 9. Care was taken to insure that the pH did not go above 10.5 over the course of the basification. After all of the material had dissolved and the pH stabilized, 1 gram of magnesium chloride hexahydrate was added. After stirring, the pH was readjusted to 9 with 20% aqueous potassium hydroxide solution, 2 grams of 10% palladium on carbon was added, and the mixture was hydrogenated on a Parr shaker at 50 psig and 100° C. for 6 hours. The reaction was cooled, 100 milliliters of ethanol was added, and the catalyst was removed by filtration. The ethanol was removed by rotary evaporation and the solution was acidified to a pH below 2 with 50% sulfuric acid. The oil was separated, 100 milliliters of water was added, the mixture was shaken, and the oil was separated to yield 20 grams of material. This material was assayed at 58% THIAA by HPLC for an 80% yield from alpha acids.

EXAMPLE 3

A 100 gram sample of aqueous alpha acid solution at pH 8 containing 14.4% alpha acids by HPLC analysis was acidified to a pH below 2 with 50% sulfuric acid. The oil was separated, 75 milliliters of water was added, and 20% aqueous potassium hydroxide solution was slowly added under nitrogen with stirring and gentle heating to adjust the pH to 11. Care was taken to insure that the pH did not go above 11 over the course of the basification. After all of the material had dissolved and the pH stabilized, 1 gram of magnesium chloride hexahydrate and 1 gram of potassium carbonate were added. After stirring, the pH was readjusted to 11 with 20% aqueous potassium hydroxide, 2 grams of 10% palladium on carbon was added, and the mixture was hydrogenated at 50 psig and 100° C. for 6 hours. The reaction was cooled, 100 milliliters of ethanol was added, and the catalyst was removed by filtration. The ethanol was removed by rotary evaporation, and the solution was acidified to a pH below 2 with 50% sulfuric acid. The oil was separated, 100 milliliters of water was added, the mixture was shaken, and the oil was separated to yield 19 grams of material. This material was assayed at 66% THIAA by HPLC for an 89% yield from alpha acids.

EXAMPLE 4

A 100 gram sample of aqueous alpha acid solution at pH 8 containing 14.4% alpha acids by HPLC analysis was acidified to a pH below 2 with 50% sulfuric acid. The oil was separated, 75 milliliters of water was added, and 20% aqueous potassium hydroxide solution was slowly added under nitrogen with stirring and gentle heating to adjust the pH to 10.5. Care was taken to insure that the pH did not go above 10.5. After all of the material had dissolved and the pH stabilized, 1 gram of potassium carbonate was added. After stirring, the pH was readjusted to 10.5 with 20% potassium hydroxide, 2 grams of 10% palladium on carbon was added, and the mixture was hydrogenated on a Parr shaker at 50 psig and 100° C. for 7 hours. The reaction was cooled, 100 milliliters of ethanol was added, and the catalyst was removed by filtration. The ethanol was removed by rotary evaporation, and the solution was acidified to a pH below 2 with 50% sulfuric acid. The oil was separated, 100 milliliters of water was added, the mixture was shaken, and the oil separated to yield 20.1 grams of material. This material was assayed at 57% THIAA by HPLC for a 79% yield from alpha acids.

EXAMPLE 5

A 100 gram sample of aqueous alpha acid solution at pH 8 containing 14.4% alpha acids by HPLC analysis was acidified to a pH below 2 with 50% sulfuric acid. The oil was separated, 30 milliliters of water and 35 milliliters of ethanol were added, and 20% potassium hydroxide was slowly added under nitrogen with stirring and gentle heating to adjust the pH to 10.5. Care was taken to insure that the pH did not go above 10.5. After all of the material had dissolved and the pH stabilized, 1 gram of potassium carbonate and 1 gram of magnesium chloride hexahydrate were added. After stirring, the pH was readjusted to 10.5 with 20% potassium hydroxide, 2 grams of 10% palladium on carbon was added, and the mixture hydrogenated on a Parr shaker at 50 psig and 100° C. for 6 hours. The reaction was cooled, 100 milliliters of ethanol added, and the catalyst removed by filtration. The ethanol was removed by rotary evaporation, and the solution was acidified to a pH below 2 with 50% sulfuric acid. The oil was separated, 100 milliliters of water was added, the mixture was shaken, and the oil separated to yield 21 grams of material. This material was assayed at 61% THIAA by HPLC for an 89% yield from alpha acids.

EXAMPLE 6

A 100 gram sample of aqueous alpha acid solution at pH 8 containing 14.4% alpha acids by HPLC analysis was acidified to a pH below 2 with 50% sulfuric acid. The oil was separated, 30 milliliters of water and 35 milliliters of methylene chloride were added, and 20% aqueous potassium hydroxide was slowly added under nitrogen with stirring and gentle heating to adjust the pH to 10.5. Care was taken to insure that the pH did not go above 10.5. After all of the material had dissolved and the pH stabilized, 1 gram of potassium carbonate and 1 gram of magnesium chloride hexahydrate were added. After stirring, the pH was readjusted to 10.5 with 20% potassium hydroxide, 2 grams of 10% palladium on carbon was added and the mixture hydrogenated on a Parr shaker at 50 psig and 100° C. for 6 hours. The reaction was cooled, 100 milliliters of methylene chloride was added, and the catalyst removed by filtration. The methylene chloride was removed by rotary evaporation, and the solution was acidified to a pH below 2 with 50% sulfuric acid. The oil was separated, 100 milliliters of water was added, the mixture was shaken, and the oil separated to yield 19.1 grams of material. This material was assayed at 67% THIAA by HPLC for an 89% yield from alpha acids.

EXAMPLE 7

A solution of 50 milliliters of methanol, 1 gram of potassium carbonate, 1 gram of magnesium chloride hexahydrate, and 20 milliliters of water was added to 100 grams of an aqueous solution containing 16.4% alpha acids. The mixture was adjusted to pH 10.5 with 20% potassium hydroxide, then 9.7 grams of a solution of 12% sodium borohydride in 14 M sodium hydroxide was added. Then 2 grams of 10% palladium on carbon was added, and the mixture was placed on a Parr shaker with 10 psig of hydrogen and heated to 100° C. As the pressure in the flask increased, it was vented to insure that the pressure stayed below 50 psig. After 3 hours, 2 grams more of 10% palladium on carbon was added and the hydrogenation was continued at 50 psig and 100° C. for 3 hours. The mixture was cooled, 100 milliliters of methanol was added, and the catalyst removed by filtration. The methanol was removed by rotary evaporation, the mixture acidified to a pH below 2 with 50% sulfuric acid, and the oil separated to yield 23.6 grams of material. HPLC indicated that HHIAA was a primary product.

The material was then steam stripped according to the following procedure.

A 10 gram sample of HHIAA oil with a noticeable ethyl ester odor was added to 50 grams of water yielding a pH of about 3. The mixture was heated to 100° C. under a nitrogen atmosphere with stirring, and water was distilled from the mixture. Fresh water was added through an addition funnel to keep the volume of the solution constant as the distillation proceeded. Once the temperature of the distillate reached 100° C., a further 50 grams of water was distilled off. The mixture was then cooled, the oil was separated, 50 milliliters of water was added, the mixture was shaken, and the oil separated once again. The product was 10 grams of HHIAA oil with no noticeable ethyl ester type odors.

In an alternative isomerization and reduction route from the alpha acids to THIAA and HHIAA the alpha acids (as described above) are first isomerized to isoalpha acids and dihydroisoalpha acids. Isoalpha acids have the following formula:

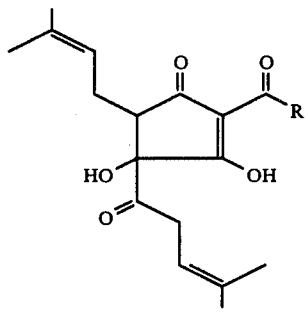

where R is isopropyl, isobutyl and sec-butyl.

Dihydroisoalpha acids have the following formula:

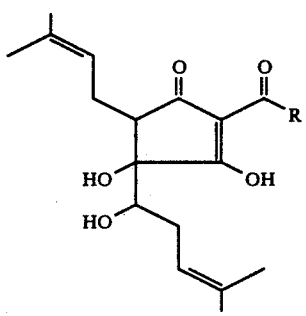

where R is isopropyl, isobutyl and sec-butyl.

Typically, when derived from hops these compounds exist as a mixture of homologs, stereoisomers and optical isomers. Conversion of hop compounds to isoalpha acids and dihydroisoalpha acids may be performed utilizing, for example, the known processes described in the background art section. The isomerized alpha acid hop oils are then reduced to the above described THIAA and HHIAA as described below.

In the reduction process of this invention, the hydrogen described above is used. In addition, preferably, the hydrogenation catalysts described above are used. As before the reaction may be performed in the presence of safe and reaction-inert gases (e.g., nitrogen).

As with the single step isomerization and reduction the pH is preferably such that the starting materials are soluble in the solution used. It is especially preferred that the pH is about 5 to about 12, as below about 5 hop oil precipitation and deoxygenation can occur and above about 12 side chain cleavage may occur. A pH of about 7 to about 11 has been found to yield the best results.

Typically, the reduction is run in a protic solvent system such as water or aqueous alcohol. However, a variety of aprotic solvents that dissolve hop oils may be used such as chlorinated solvents (e.g., methylene chloride) and hydrocarbon solvents. As before, depending on the form of the alpha acid (oil, salt, etc.) the pH may require adjustment. This is accomplished by conventional methods such as addition of a suitable base (e.g., KOH). In addition, a buffer may be advantageously utilized in quantities sufficient to aid in maintaining the desired pH.

Typically, the same pressures and temperatures can be used that are used with the combined isomerization and reduction. However, depending on the solvent system, the temperature may be lower, albeit with a reduction in reaction speed. The reaction time for reduction alone is typically about the same as for combined isomerization and reduction (i.e., about 6 hours to about 8 hours). In addition, the same solvent system parameters that applied to the simultaneous isomerization and reduction apply to the alternative reduction reaction.

Subsequent to reduction, the product can, as before, be isolated by acid precipitation and purified by steam stripping.

Typically, the above process can yield up to about 100% of the desired THIAA and HHIAA.

EXAMPLE 8

A 2 gram sample of 10% palladium on carbon was added to 100 grams of aqueous isoalpha acid solution at pH 10 containing 20% isoalpha acids by HPLC analysis. The mixture was hydrogenated on a Parr shaker at 50 psig and 100° C. for 6 hours. The reaction was cooled, 100 milliliters of ethanol was added, and the catalyst was removed by filtration. The ethanol was removed by rotary evaporation, and the solution was acidifed to a pH below 2 with 50% sulfuric acid. The oil was separated, 100 milliliters of water was added, the mixture was shaken, and the oil was separated to yield 31.1 grams of material. This material was assayed at 61% THIAA by HPLC for a 95% yield from isoalpha acids.

EXAMPLE 9

A pH 10 aqueous solution of isoalpha acids was acidified to a pH below 2 with 50% sulfuric acid. The oil was separated and dissolved in 100 milliliters of a 2:1 mixture of ethanol and water. The pH was adjusted to 3 with a 20% aqueous solution of potassium hydroxide, and 2 grams of 10% palladium on carbon was added. The mixture was hydrogenated on a Parr shaker at 50 psig and 30° C. for 6 hours. The reaction was cooled, and the catalyst removed by filtration. The ethanol was removed by rotary evaporation, and the solution was acidified to a pH below 2 with 50% sulfuric acid. The oil was separated, 100 milliliters of water was added, the mixture was shaken, and the oil was separated to yield 27.8 grams of material. This material was assayed at 55% THIAA by HPLC for a 76% yield from isoalpha acids.

EXAMPLE 10

A pH 10 aqueous solution of isoalpha acids was acidified to below 2 with 50% sulfuric acid. The oil was separated and dissolved in 100 milliliters of a 2:1 mixture of ethanol and water. The pH was adjusted to 7 with a 20% aqueous solution of potassium hydroxide, and 2 grams of 10% palladium on carbon was added. The mixture was hydrogenated on a Parr shaker at 50 psig and 30° C. for 6 hours. The reaction was cooled, and the catalyst was removed by filtration. The ethanol was removed by rotary evaporation, the solution was acidified to a pH below 2 with 50% sulfuric acid, and the oil was separated. To the oil, 100 milliliters of water was added, the mixture was shaken, and the oil was separated to yield 28.8 grams of material. This material was assayed at 69% THIAA by HPLC for a 99% yield from isoalpha acids.

EXAMPLE 11

A pH 10 aqueous solution of isoalpha acids was acidified to a pH below 2 with 50% sulfuric acid. The oil was separated and dissolved in 100 milliliters of a 2:1 mixture of ethanol and water. The pH was adjusted to 10.0 with a 20% aqueous solution of potassium hydroxide, and 2 grams of 10% palladium on carbon was added. The mixture was hydrogenated on a Parr shaker at 50 psig and 30° C. for 6 hours. The reaction was cooled, and the catalyst was removed by filtration. The ethanol was removed by rotary evaporation, the solution was acidified to a pH below 2 with 50% sulfuric acid, and the oil was separated. To the oil, 100 milliliters of water was added, the mixture was shaken, and the oil was separated to yield 28.2 grams of material. This material was assayed at 66% THIAA by HPLC of a 93% yield from isoalpha acids.

EXAMPLE 12

A pH 10 aqueous solution of isoalpha acids was acidified to a pH below 2 with 50% sulfuric acid. The oil was separated and dissolved in 100 milliliters of methylene chloride, 2 grams of 10% palladium on carbon was added, and the mixture was hydrogenated on a Parr shaker at 50 psig and 30° C. for 6 hours. The reaction was cooled, and the catalyst was removed by filtration. The methylene chloride was removed by rotary evaporation to yield 27.5 grams of material. This material was assayed at 73% THIAA by HPLC for a 100% yield from isoalpha acids.

EXAMPLE 13

A 1 gram sample of 10% palladium on carbon was added to 10 grams of dihydroisoalpha acids oil in 100 milliliters of ethanol. The mixture was hydrogenated on a Parr shaker at 50 psig and 25° C. for 6 hours. The reaction was cooled, and the catalyst was removed by filtration. The ethanol was removed by rotary evaporation, and the solution was acidified to a pH below 2 with 50% sulfuric acid. The oil was separated, 100 milliliters of water was added, the mixture was shaken, and the oil was separated to yield 11.1 grams of material. This material was assayed to be primarily HHIAA by HPLC.

This invention makes a significant contribution to the field of beer making by providing effective, efficient methods of producing THIAA and HHIAA. The THIAA produced by this invention is of high purity. The high yielding reaction sequence results in fewer by-products resulting in a material that is of high purity and well suited for use in a food product such as beer.

These processes start with alpha acids thereby eliminating the need for the oxidation step typically used in processes starting with a beta acid. The simultaneous isomerization and reduction processes of this invention produce high yields of the desired THIAA in contrast to prior art alpha acid hydrogenations.

In addition, this invention provides a high yielding, high purity, isoalpha acid reduction. This reaction is surprisingly efficient in protic solvents at a pH of about 5 to about 11, giving much higher yields of THIAA than prior art hydrogenations at lower pH. Also surprising is that hydrogenation of isoalpha acids in their acidic forms (i.e., without pH adjustment) in aprotic solvents gives excellent yields of THIAA.

Finally, the only known route to HHIAA is via reduction of THIAA. This invention provides two efficient routes to HHIAA from alpha acids or dihydroisoalpha acids.

It should be understood that the invention is not limited to the particular embodiments shown and described herein, but that various changes and modifications may be made without departing from the spirit and scope of this novel concept as defined by the following claims.

I claim:

1. A method of converting alpha acids to hop flavors comprising exposing the alpha acids to an environment, capable of substantially simultaneously isomerizing and reducing the alpha acids to form tetrahydroisoalpha acids, and thus forming tetrahydroisoalpha acids.

2. The method as recited in claim 1 wherein the alpha acid is exposed to hydrogen gas and a supported noble metal catalyst in a reaction inert solvent.

3. The method as recited in claim 2 wherein the catalyst is palladium.

4. The method as recited in claim 3 wherein sufficient buffering agent is added prior to exposure to palladium to maintain the pH at about 10 to about 11.

5. The method as recited in claim 4 wherein the buffering agent is potassium carbonate.

6. The method as recited in claim 2 wherein the pH is about 8 to about 12.

7. The method as recited in claim 6 wherein the simultaneous isomerization and reduction occurs in a protic solvent system.

8. The method as recited in claim 6 wherein an alkaline earth metal salt is added prior to isomerization and reduction.

9. The method as recited in claim 8 wherein the alkaline earth metal salt is magnesium chloride.

10. A method of converting alpha acids to hop flavors comprising exposing the alpha acids to an environment, capable of substantially simultaneously isomerizing and reducing the alpha acids to form hexahydroisoalpha acids, and thus forming hexahydroisoalpha acids.

11. The method as recited in claim 10 wherein the alpha acid is exposed to hydrogen gas and a supported noble metal catalyst at elevated temperatures and pressures in a reaction inert solvent.

12. The method as recited in claim 11 wherein the catalyst is palladium.

13. The method as recited in claim 12 wherein sufficient buffering agent is added prior to exposure to palladium to maintain the pH 10–11.

14. The method as recited in claim 13 wherein the buffering agent is potassium carbonate.

15. The method as recited in claim 11 wherein the pH is about 8 to about 12.

16. The method as recited in claim 15 wherein the simultaneous isomerization and reduction occurs in a protic solvent system.

17. The method as recited in claim 15 wherein an alkaline earth metal salt is added prior to hydrogenation.

18. The method as recited in claim 15 wherein sufficient reducing agent is added to reduce tetrahydroisoalpha acids to hexahydroisoalpha acids.

19. The method as recited in claim 18 wherein the reducing agent is sodium borohydride.

20. The method as recited in claim 19 wherein about 2 to about 3 hydride equivalents of sodium borohydride are added.

21. The method as recited in claim 15 wherein the pressure is about atmospheric to about 2000 psig and the temperature is about 50° C. to about 200° C.

22. A method of reducing hop flavors comprising exposing an isoalpha acid, a dihydroisoalpha acid or a mixture thereof to conditions capable of reducing said acids to produce tetrahydroisoalpha acids, hexahydroisoalpha acids or a mixture thereof at a pH of about 5 to about 12 in a reaction inert, aprotic solvent and thus forming tetrahydroisoalpha acids, hexahydroisoalpha acids or a mixture thereof.

23. The method as recited in claim 22 wherein the acids are reduced by exposure to hydrogen in the presence of a supported noble metal catalyst.

24. The method as recited in claim 23 wherein the noble metal catalyst is palladium.

25. The method as recited in claim 23 wherein the reduction occurs at a pressure of about atmospheric to about 2000 psig and a temperature of about 50° C. to about 200° C.

26. The method as recited in claim 23 wherein the isoalpha acid is maintained at a pH of about 7 to about 11.

27. The method as recited in claim 23 wherein the reduction occurs in water.

28. A method of reducing hop flavors comprising exposing an isoalpha acid, a dihydroisoalpha acid or a mixture thereof to conditions capable of reducing said acids to produce tetrahydroisoalpha acids, hexahydroisoalpha acids or a mixture thereof in a reaction inert, aprotic solvent and thus forming tetrahydroisoalpha acids, hexahydroisoalpha acids or a mixture thereof.

29. The method as recited in claim 28 wherein the acids are reduced by exposure to hydrogen in the presence of a supported noble metal catalyst.

30. The method as recited in claim 29 wherein the noble metal catalyst is palladium.

31. The method as recited in claim 30 wherein the reduction occurs at a pressure of about atmospheric to about 2000 psig and a temperature of about 50° C. to about 200° C.

32. The method as recited in claim 30 wherein the reduction occurs in an aprotic solvent selected from the group consisting of chlorinated solvents and hydrocarbon solvents.

33. The method as recited in claim 32 wherein the solvent is methylene chloride, 1,2-dichloroethane or 1,1,2-trichloroethane.

* * * * *

UNITED STATES PATENT AND TRADEMARK OFFICE
CERTIFICATE OF CORRECTION

PATENT NO. : 5,013,571
DATED : May 7, 1991
INVENTOR(S) : Bruce A. HAY

It is certified that error appears in the above-indentified patent and that said Letters Patent is hereby corrected as shown below:

Claim 22, line 30 "aprotic" should read --protic--.

Signed and Sealed this

Twenty-second Day of December, 1998

Attest:

BRUCE LEHMAN

Attesting Officer

Commissioner of Patents and Trademarks